(12) United States Patent
Lee et al.

(10) Patent No.: US 7,628,585 B2
(45) Date of Patent: Dec. 8, 2009

(54) AIRFOIL LEADING EDGE END WALL VORTEX REDUCING PLASMA

(75) Inventors: Ching-Pang Lee, Cincinnati, OH (US); Aspi Rustom Wadia, Loveland, OH (US); David Glenn Cherry, Loveland, OH (US); Je-Chin Han, College Station, TX (US)

(73) Assignee: General Electric Company, Schenectady, NY (US)

( * ) Notice: Subject to any disclaimer, the term of this patent is extended or adjusted under 35 U.S.C. 154(b) by 612 days.

(21) Appl. No.: 11/639,876

(22) Filed: Dec. 15, 2006

(65) Prior Publication Data
US 2008/0145210 A1 Jun. 19, 2008

(51) Int. Cl.
*F01D 5/18* (2006.01)
(52) U.S. Cl. .............................. 416/1; 415/10; 415/914; 416/96 A
(58) Field of Classification Search ............... 415/115, 415/16, 914; 416/1, 10, 95, 96 A, 96 R, 97 R; 219/121.36, 121.44; 315/111.01
See application file for complete search history.

(56) References Cited

U.S. PATENT DOCUMENTS

| | | | |
|---|---|---|---|
| 5,181,379 A | 1/1993 | Wakeman et al. | |
| 5,233,828 A | 8/1993 | Napoli | |
| 5,241,827 A | 9/1993 | Lampes | |
| 5,320,309 A | * 6/1994 | Nosenchuck et al. | ........ 244/205 |
| 5,337,568 A | 8/1994 | Lee et al. | |
| 5,419,681 A | 5/1995 | Lee | |
| 5,465,572 A | 11/1995 | Nicoll et al. | |
| 5,503,529 A | 4/1996 | Anselmi et al. | |
| 5,651,662 A | 7/1997 | Lee et al. | |
| 5,660,525 A | 8/1997 | Lee et al. | |
| 5,747,769 A | 5/1998 | Rockstroh et al. | |

(Continued)

FOREIGN PATENT DOCUMENTS

EP    1906136 A1    9/2008

(Continued)

OTHER PUBLICATIONS

European Search Report and Opinion, Application No. EP07254056, Mar. 12, 2009, 10 pages.

(Continued)

*Primary Examiner*—Edward Look
*Assistant Examiner*—Sean J Younger
(74) *Attorney, Agent, or Firm*—William Scott Andes; Steven J. Rosen

(57) ABSTRACT

A leading edge vortex reducing system includes a gas turbine engine airfoil extending in a spanwise direction away from an end wall, one or more plasma generators extending in the spanwise direction through a fillet between the airfoil and the end wall in a leading edge region near and around a leading edge of the airfoil and near the fillet. The plasma generators being operable for producing a plasma extending over a portion of the fillet in the leading edge region. The plasma generators may be mounted on an outer wall of the airfoil with a first portion of the plasma generators on a pressure side of the airfoil and a second portion of the plasma generators on a suction side of the airfoil. A method for operating the system includes energizing one or more plasma generators to form the plasma in steady state or unsteady modes.

39 Claims, 8 Drawing Sheets

U.S. PATENT DOCUMENTS

| | | | |
|---|---|---|---|
| 6,283,713 B1* | 9/2001 | Harvey et al. | 416/193 A |
| 6,570,333 B1* | 5/2003 | Miller et al. | 315/111.21 |
| 6,619,030 B1 | 9/2003 | Seda et al. | |
| 6,655,149 B2 | 12/2003 | Farmer et al. | |
| 6,708,482 B2 | 3/2004 | Seda | |
| 6,732,502 B2 | 5/2004 | Seda et al. | |
| 6,761,956 B2 | 7/2004 | Lee et al. | |
| 6,805,325 B1* | 10/2004 | Malmuth et al. | 244/205 |
| 6,991,430 B2 | 1/2006 | Stec et al. | |
| 7,008,179 B2 | 3/2006 | Rinck et al. | |
| 7,094,027 B2 | 8/2006 | Turner et al. | |
| 2006/0005545 A1 | 1/2006 | Samimy et al. | |
| 2006/0104807 A1 | 5/2006 | Lee | |

FOREIGN PATENT DOCUMENTS

WO    WO2005/114013 A1    12/2005

OTHER PUBLICATIONS

AIAA 2007-647, Stereo PIV of a Turbine Tip Clearance Flow with Plasma Actuation, Daniel K. Van Ness II, Thomas C. Corke, and Scott C. Morris, 22 pages.

AIAA 2006-20, "Turbine Blade Tip Leakage Flow Control by Partial Squealer Tip and Plasma Actuators", Travis Douville, Julia Stephens, Thomas Corke, and Scott Morris, 18 pages.

AIAA 2005-782, "Tip Clearance Control Using Plasma Actuators", Scott C. Morris, Thomas C. corke, Daniel Van Ness, Julia Stephens, and Travis Douville, 8 pages.

XP007907306, "Active Flow Control in Turbomachinery Using Phased Plasma Actuators", B. Goksel and I. Rechenberg, 2 pages.

XP009112404, "Turbine Tip Clearance Flow Control using Plasma Actuators", Daniel K. Van Ness II, Thomas Co. Corke, and Scott C. Morris, 12 pages.

Science Direct, "SDBD plasma enhanced aerodynamics: concepts optimization and applications", Thomas C. Corke, Martiqua L. Post, and Dmitry M. Orlov, 26 pages.

XP007907356, "Plasma (physics)", From Wikipedia, 16 pages.

XP007907353, "Dielectric barrier discharge", From Wikipedia, 2 pages.

"Overview of Plasma Flow Control: Concepts, Optimization, and Applications", Thomas C. Corke and Martiqua L. Post, 43rd AIAA Aerospace Sciences Meeting and Exhibit, Jan. 10-13, 2005, Reno, Nevada, AIAA 2005-563, 15 pages.

"Plasma Control Of Boundary Layer Using Low-Temperature Non-Equilibrium Plasma Of Gas Discharge", D.F. Opaits, D.V. Roupassov, S.M. Starikovskaia, A.Yu. Starikovskii, I.N. Zavialov, and S.G. Saddoughi, 43rd AIAA Aerospace Sciences Meeting and Exhibit, Jan. 10-13, 2005, Reno, Nevada, AIAA 2005-1180, 6 pages.

"Demonstration Of Separation Delay With Glow-Discharge Plasma Actuators", Lennart S. Hultgren and David E. Ashpis, 41st AIAA Aerospace Sciences Meeting and Exhibit, Jan. 6-9, 2003, Reno, Nevada, AIAA 2003-1025, 10 pages.

"Unsteady Plasma Actuators for Separation Control of Low-Pressure Turbine Blades", Junhui Huang, Thomas C. Corke and Flint O. Thomas, AIAA Journal, vol. 44, No. 7, Jul. 2006, pp. 1477-1487.

"Control of Separation in Turbine Boundary Layers", R.B. Rivir, R. Sondergaard, J.P. Bons, and N. Yurchenko, 2nd AIAA Flow Control Conference, Jun. 28-Jul. 1, 2004, Portland, Oregon, 16 pages.

"Plasma Flow Control Optimized Airfoil", Thomas C. Corke, Benjamin Mertz, and Mehul P. Patel, 44th AIAA Aerospace Sciences Meeting and Exhibit, Jan. 9-12, 2006, Reno, Nevada, AIAA 2006-1208, 13 pages.

"Control of Transitional and Turbulent Flows Using Plasma-Based Actuators", Miguel R. Visbal, Datta V. Gaitonde, and Subrata Roy, 36th AIAA Fluid Dynamics Conference and Exhibit, Jun. 5-8, 2006, San Francisco, California, AIAA 2006-3230, 22 pages.

"AC And Pulsed Plasma Flow Control", R. Rivir, A. White, C. Carter, B. Ganguly, J. Jacob, A. Forelines, and J. Crafton, 42nd AIAA Aerospace Sciences Meeting and Exhibit, Jan. 5-8, 2004, Reno, Nevada, AIAA 2004-847, 9 pages.

"Effects Of Plasma Induced Velocity On Boundary Layer Flow", Brian E. Balcer, Milton E. Franke, and Richard B. Rivir, 44th AIAA Aerospace Sciences Meeting and Exhibit, Jan. 9-12, 2006, Reno, Nevada, AIAA 2006-875, 12 pages.

"Flow Control Using Plasma Actuators and Linear / Annular Plasma Synthetic Jet Actuators", Arvind Santhanakrishan, Jamey D. Jacob, and Yildirim B. Suzen, 3rd AIAA Flow Control Conference, Jun. 5-8, 2006, San Francisco, California, AIAA 2006-3033, 31 pages.

"Turbulent Drag Reduction by Surface Plasma through Spanwise Flow Oscillation", Timothy N. Jukes, Kwing-So Choi, Graham A. Johnson, and Simon J. Scott, 3rd AIAA Flow Control Conference, Jun. 5-8, 2006, San Francisco, California, AIAA 2006-3693, 14 pages.

\* cited by examiner

AIRFOIL LEADING EDGE END WALL VORTEX REDUCING PLASMA

BACKGROUND OF THE INVENTION

1. Field of the Invention

The invention relates to aerodynamics of and cooling of hot turbine airfoil and end wall surfaces in a region where the airfoil and end wall meet such as an intersection of turbine vane airfoils and bands between which they radially extend and such as turbine rotor blades and the bases from which they extend radially outwardly.

2. Description of Related Art

A typical gas turbine engine of the turbofan type generally includes a forward fan and a booster or low pressure compressor, a middle core engine, and a low pressure turbine which powers the fan and booster or low pressure compressor. The core engine includes a high pressure compressor, a combustor and a high pressure turbine in a serial flow relationship. The high pressure compressor and high pressure turbine of the core engine are connected by a high pressure shaft. High pressure air from the high pressure compressor is mixed with fuel in the combustor and ignited to form a very hot high energy gas flow. The gas flow passes through the high pressure turbine, rotatably driving it and the high pressure shaft which, in turn, rotatably drives the high pressure compressor.

The gas flow leaving the high pressure turbine is expanded through a second or low pressure turbine. The low pressure turbine rotatably drives the fan and booster compressor via a low pressure shaft. The low pressure shaft extends through the high pressure rotor. Most of the thrust produced is generated by the fan. Marine or industrial gas turbine engines have low pressure turbines which power generators, ship propellers, pumps and other devices while turboprops engines use low pressure turbines to power propellers usually through a gearbox.

The high and low pressure turbines have at least one turbine nozzle including at least one row of circumferentially spaced apart airfoils or vanes radially extending between radially inner and outer bands. The vanes are usually hollow having an outer wall that is cooled with cooling air from the compressor. Hot gases flowing over the cooled turbine vane outer wall produces flow and thermal boundary layers along hot outer surfaces of the vane outer wall and end wall hot surfaces of the inner and outer bands over which the hot gases pass. The high and low pressure turbines also have at least one row of turbine rotor blades including circumferentially spaced apart airfoils extending radially outwardly from turbine blade platforms. The turbine blade platforms and the radially inner and outer bands are also referred to as end walls with regard to the airfoils, particularly in the region of intersection of the airfoils and the bands and platforms.

When the hot gas flow approaches turbine airfoils, there are flow boundary layers along airfoil surfaces and end wall surfaces. At fillets between the airfoils and the end walls, these two boundary layers merge and create a pressure gradient within the boundary layers. This pressure gradient can form a pair of horseshoe vortices at a leading edge of the fillet, one on a pressure side and the other on a suction side of the airfoil. The pressure side vortices travel downstream along the end wall surface. The suction side vortices travel downstream along the suction side airfoil wall and move radially away from the end wall as they are approach a trailing edge of the airfoil. These vortices cause pressure losses and increase surface heating. It is desirable to minimize the strength of the horseshoe vortices for better aerodynamic performance and lower surface heating.

SUMMARY OF THE INVENTION

A leading edge vortex reducing system includes a gas turbine engine airfoil extending in a spanwise direction away from an end wall, a fillet between the airfoil and the end wall, and a leading edge region near and around a leading edge of the airfoil. One or more plasma generators extend in the spanwise direction through the fillet in the leading edge region and the plasma generators are operable for producing a plasma extending over a portion of the fillet in the leading edge region.

The plasma generators may be mounted on an outer wall of the airfoil. A first portion of the plasma generators may be mounted on a pressure side of the airfoil and a second portion of the plasma generators may be mounted on a suction side of the airfoil. The plasma generators may have inner and outer electrodes separated by a dielectric material and the dielectric material may be disposed within a groove in an outer hot surface of an outer wall of the airfoil. An AC power supply is connected to the electrodes to supply a high voltage AC potential to the electrodes.

The system may be used with a high pressure turbine nozzle vane including the airfoil extending radially in a spanwise direction between radially inner and outer bands respectively and the end wall being either one of the bands. The system may be used a high pressure turbine rotor blade including the airfoil extending radially outwardly from an airfoil base on a blade platform and the end wall being the blade platform.

One method for operating the leading edge vortex reducing system includes energizing one or more plasma generators to form a plasma extending over a portion of a fillet in a leading edge region of a gas turbine engine airfoil. The method may further include using a first portion of the plasma generators mounted on a pressure side of the airfoil and a second portion of the plasma generators mounted on a suction side of the airfoil to form plasma on the pressure and suction sides of the airfoil respectively. The plasma generators may be operated in steady state or unsteady modes.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
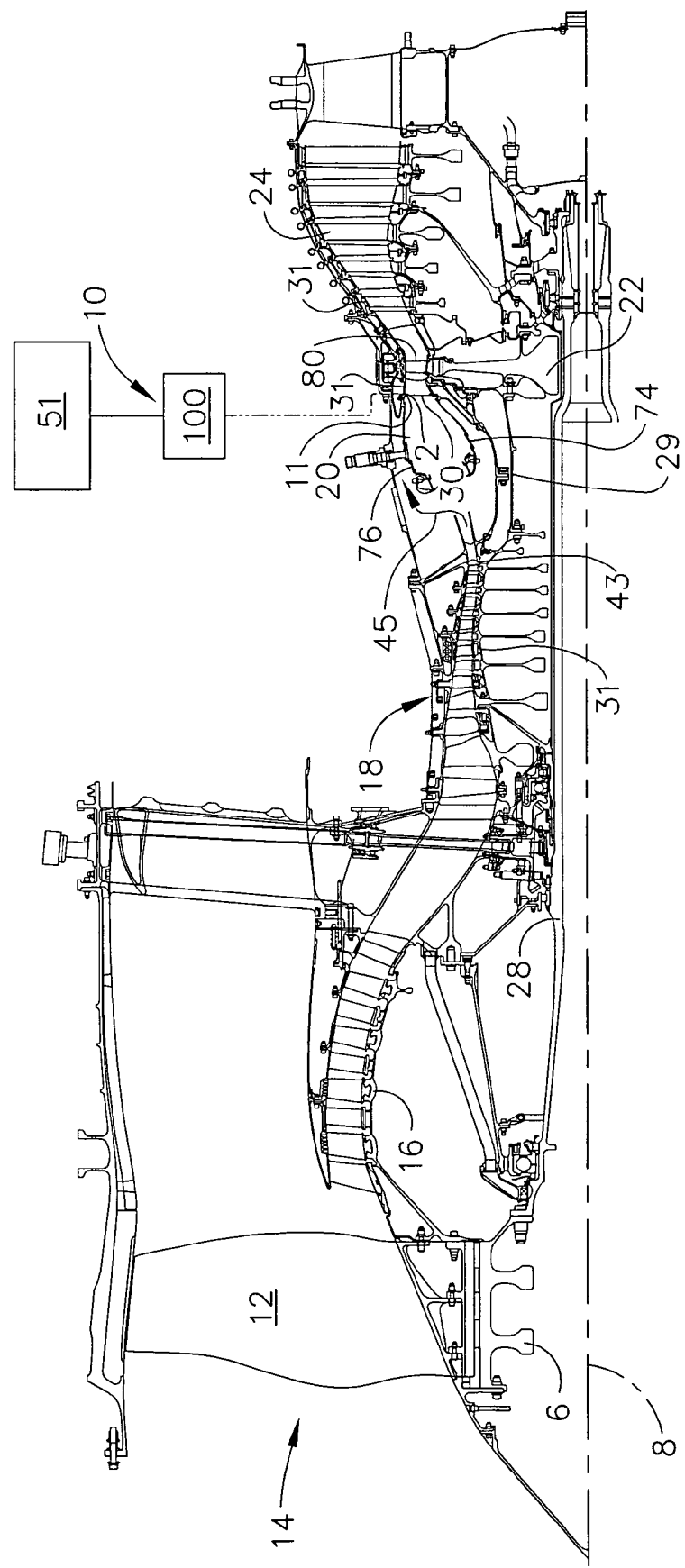
FIG. 1 is a longitudinal, sectional view illustration of exemplary embodiment of an aircraft gas turbine engine with a leading edge vortex reducing system illustrated for turbine vanes and rotor blades of a high pressure turbine section of the engine.

Illustrated in FIG. 1 is an exemplary turbofan gas turbine engine 10 circumscribed about an engine centerline axis 8 and having a fan 12 which receives ambient air 14, a booster or low pressure compressor (LPC) 16, a high pressure compressor (HPC) 18, a combustor 20, a high pressure turbine (HPT) 22, and a low pressure turbine (LPT) 24 from which combustion gases are discharged from the engine 10. The HPT 22 is joined to the HPC 18 to substantially form a high pressure rotor 29. A low pressure shaft 28 joins the LPT 24 to both the fan 12 and the low pressure compressor 16. The second or low pressure shaft 28 which is at least in part rotatably disposed co-axially with and radially inwardly of the first or high pressure rotor. The main combustor 20 includes inner and outer combustor liners 74, 76. The main combustor 20 mixes fuel with the air 14 pressurized by the HPC 18 for generating combustion gases or gas flow 19 which flows downstream through the turbines.

Illustrated in FIGS. 2-5 is the turbine nozzle 30 of the high pressure turbine 22 through which the hot gas flow 19 is discharged into from the combustor 20. The exemplary embodiment of the turbine nozzle 30 illustrated herein, also more generally referred to as a vane assembly 31, includes a row 33 of circumferentially spaced apart vanes 32. The vanes 32 have airfoils 39 extending radially in a spanwise direction S between radially inner and outer bands 38, 40, respectively. The airfoils 39 extend in a chordwise direction C between a leading edge LE and a trailing edge TE of the airfoil.

In the exemplary embodiment of the turbine nozzle 30 illustrated herein, the bands and vanes and airfoils are formed in circumferential segments 42 typically, with two airfoils 39 per segment 42. There may be more than two segments and the segments typically have axial split lines suitably joined together by conventional spline seals therebetween. The inner and outer bands 38, 40, aerodynamically serves as an airfoil end wall 88 for the airfoils 39. A portion of compressor discharge air 45 is used to supply pressurized cooling air 35 to the turbine nozzle 30 for cooling the various components thereof including the hollow airfoils 39 and inner and outer bands. Cooling air 35 is also used to film cool an annular shroud 72 surrounding rotatable blade tips 82 of the high pressure turbine 22.

Each airfoil 39 includes an outer wall 26 having a pressure side 46 and a circumferentially opposite suction side 48 which extend axially in a chordwise direction C between opposite leading and trailing edges LE, TE, respectively. The airfoils 39 and the outer walls 26 extend radially in a spanwise direction S between the inner and outer bands 38, 40. The bands are typically integrally cast with the corresponding vanes during initial manufacture thereof. The hot combustion gas flow 19 pass through flow passages 50 between the airfoils 39. The flow passages 50 are bound by inboard hot surfaces 52, with respect to the gas flow 19, of the inner and outer bands 38, 40 and outer hot surfaces 54 of then outer wall 26 along the pressure and suction sides 46, 48 of the airfoils 39.

Figure 2:
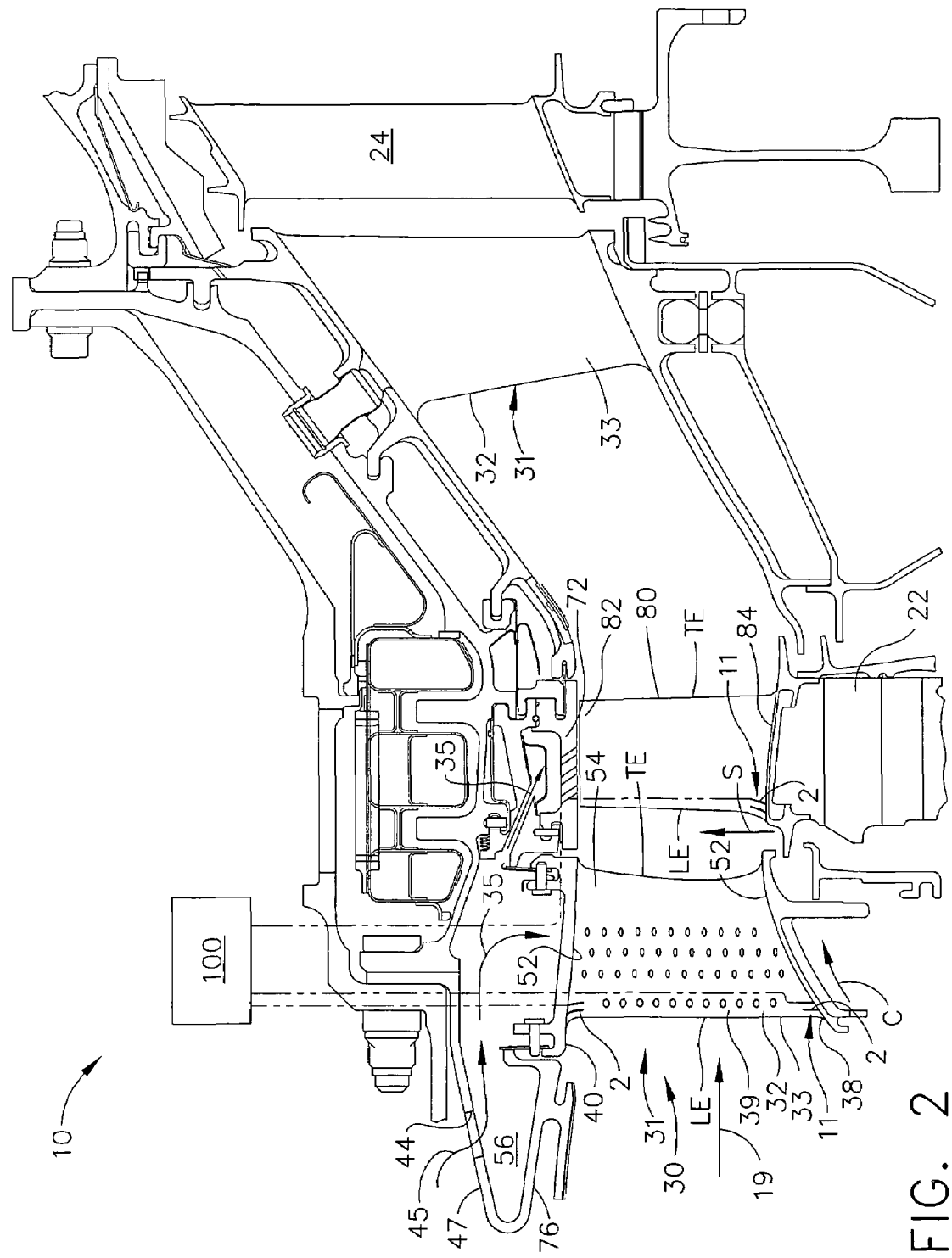
FIG. 2 is an enlarged view of the vanes and blades illustrated in FIG. 1.
Figure 3:
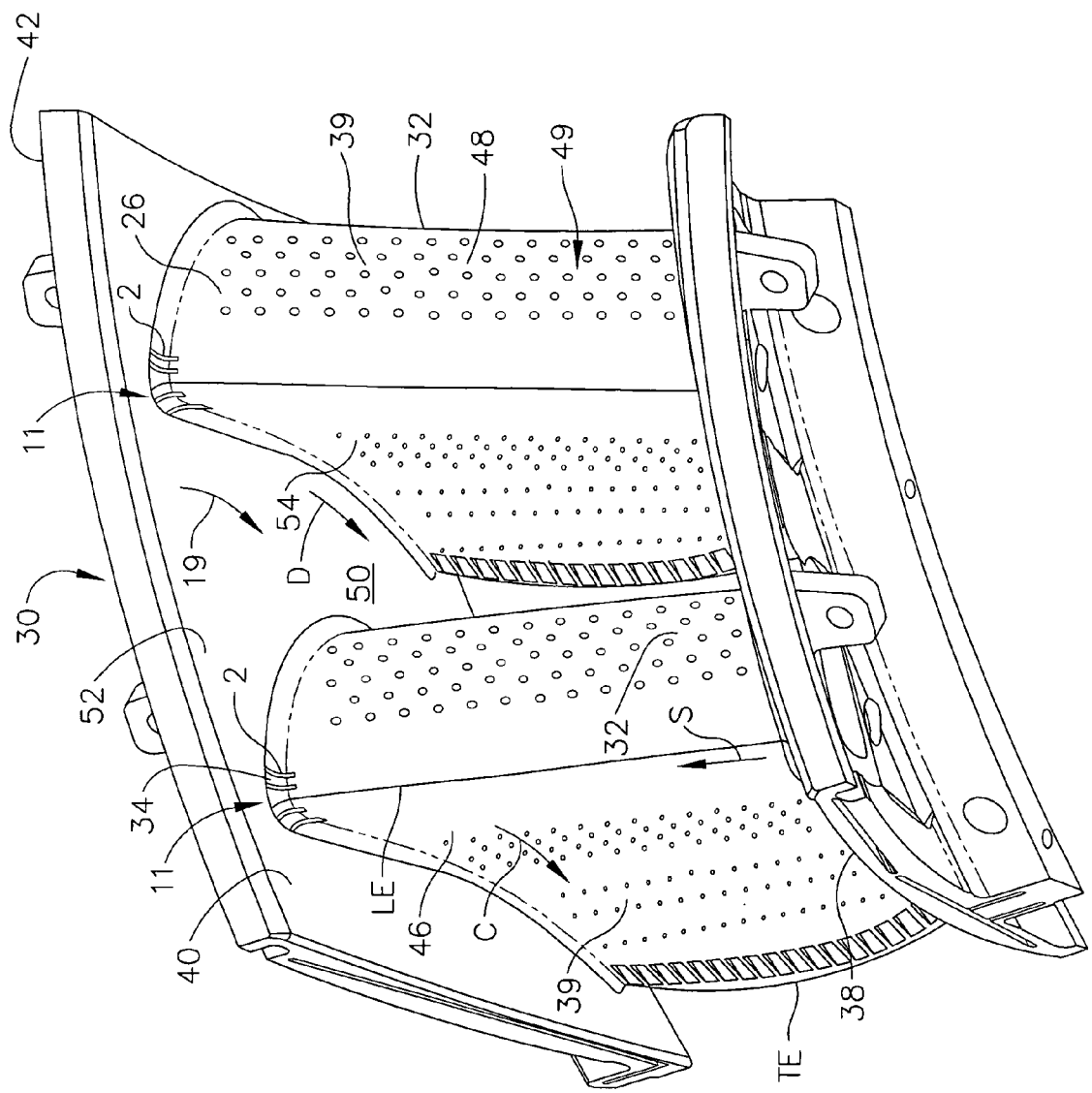
FIG. 3 is a perspective view of the vanes and plasma generators associated with an outer band of a vane assembly illustrated in FIG. 2.
Figure 4:
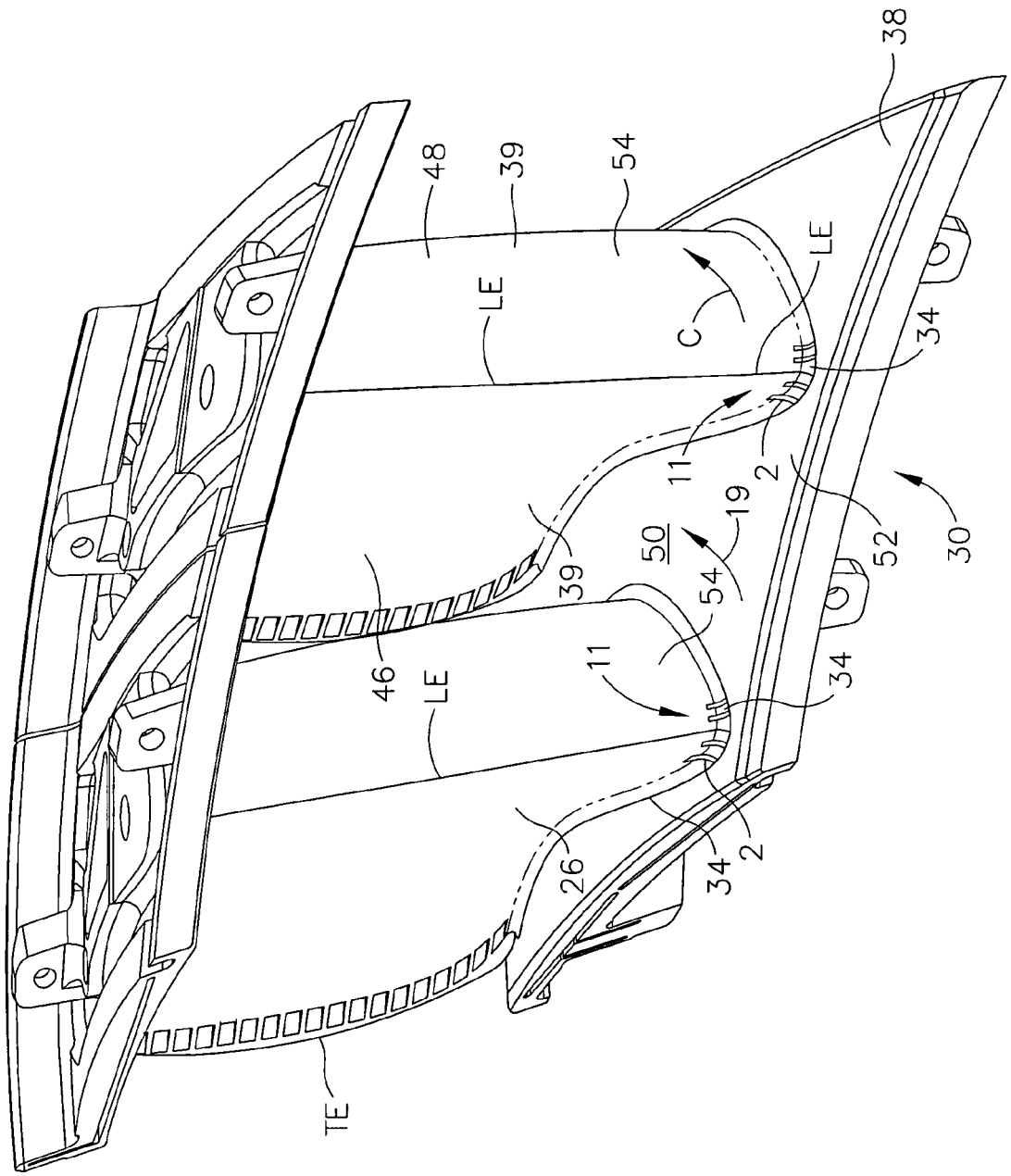
FIG. 4 is a perspective view of the vanes and plasma generators associated with an inner band of a vane assembly illustrated in FIG. 2.

The outer walls 26 are film cooled by using pressurized cooling air 35 which is a portion of the compressor discharge air 45 from a last high pressure compressor stage 43 at a downstream end of the high pressure compressor 18 as illustrated in FIGS. 1 and 2. The portion of the compressor discharge air 45 flows around the outer combustor liner 76 and through liner apertures 44 in a downstream flange 47 of the outer combustor liner 76 into a cooling air plenum 56. The portion of the compressor discharge air 45 that flows into the cooling air plenum 56 is used as the cooling air 35 and flows into hollow interiors 41 of the airfoils 39. Film cooling apertures 49 extend across the wall 26 from a cold surface 59 of the wall 26 to the outer hot surface 54 of the wall 26 in a generally downstream direction D.

Fillets 34 are disposed between the airfoils 39 and the inner and outer bands 38, 40 or in more general terms between the airfoils 39 and the end walls 88. The high pressure turbine 22 includes at least one row of circumferentially spaced apart high pressure turbine blades 80. Each of the turbine blades 80 has a turbine airfoil 39 extending radially outwardly from an airfoil base 84 to an airfoil tip 82. The base 84 is on a blade platform 86 which aerodynamically serves as an airfoil end wall 88 for the turbine airfoil 39. Fillets 34 are also disposed between the turbine airfoil 39 and the blade platform 86 or in more general terms between the turbine airfoils 39 and the end walls 88.

Figure 9:
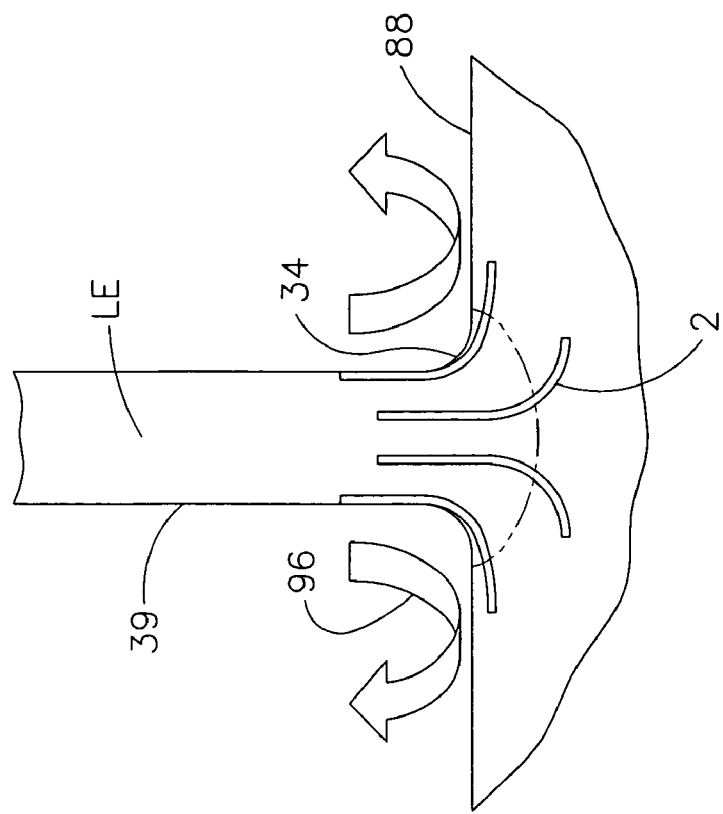
FIG. 9 is a perspective view illustration of the airfoil and end wall with the leading edge vortex reducing system with the plasma generators illustrated in FIG. 4 turned off.

Flow boundary layers form along airfoil surfaces and end wall surfaces when the hot gas flow 19 approaches the turbine airfoils 39. These two boundary layers merge and create a pressure gradient within the boundary layers at the fillets 34 between the airfoils 39 and the end walls 88. This pressure gradient can form a pair of horseshoe vortices in a leading edge region 89 of the fillet 34 near and around a leading edge LE of the airfoil 39. One horseshoe vortex forms on the pressure side 46 and the other horseshoe vortex forms on the suction side 48 of the airfoil 39 in the leading edge region 89 (as illustrated in FIG. 9). Pressure side vortices travel downstream along the end wall surface and suction side vortices travel downstream along the suction side airfoil wall and move radially away from the end wall 88 as they are approach the trailing edge TE of the airfoil 39. These vortices cause pressure losses and increase surface heating. It is desirable to minimize the strength of the horseshoe vortices for better aerodynamic performance and lower surface heating.

A leading edge vortex reducing system 11 is used to reduce or minimize the strength of the horseshoe vortices in the leading edge region 89 between the airfoils 39 and the end walls 88 in the vicinity of the leading edge LE in order to improve aerodynamic performance and lower surface heating along the end walls and airfoils. One or more generally spanwise or radially extending plasma generators 2 are disposed along and between each airfoil 39 and associated end wall 88 and in the leading edge region 89 along or in the vicinity of the leading edge LE of the airfoil 39. The leading edge region 89 of the fillet 34 extends chordwise around the airfoil 39 through small portions of the pressure and the suction sides 46, 48 of the airfoil 39 and includes a portion of the fillets 34 in the vicinity of the leading edge.

Figure 5:
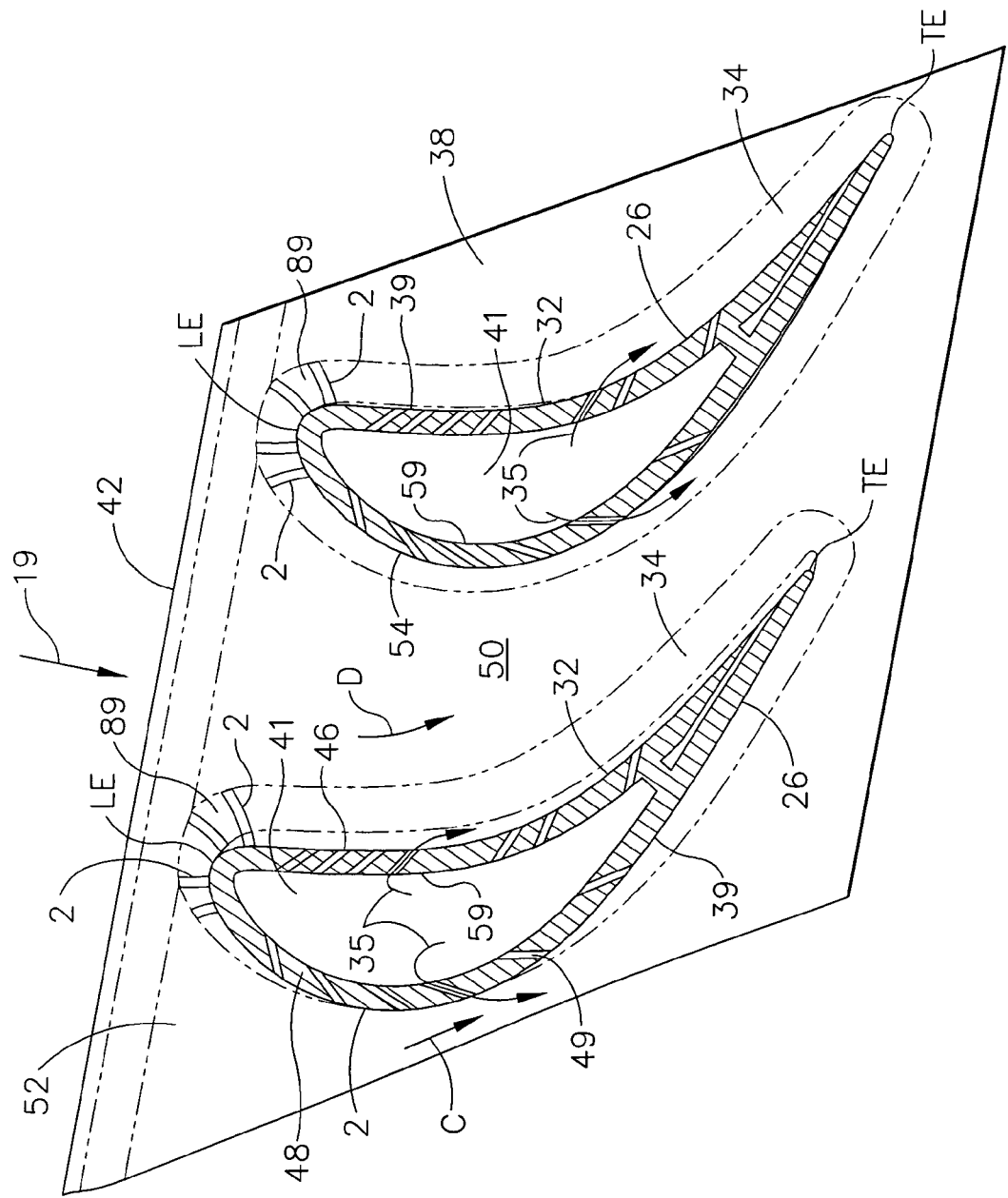
FIG. 5 is a cross sectional view illustration through the vanes illustrated in FIG. 3.
Figure 6:
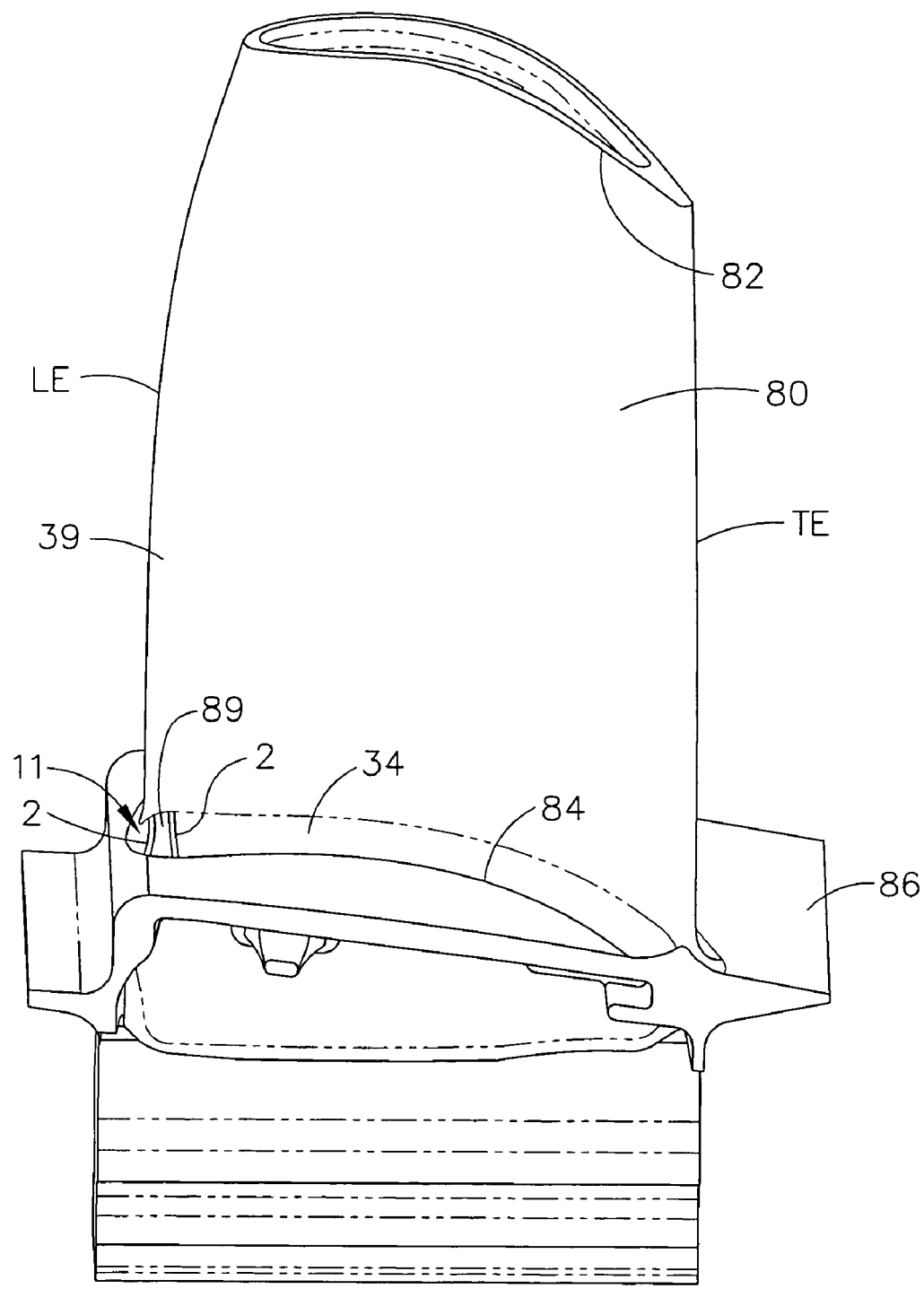
FIG. 6 is a perspective view of the blade and plasma generators illustrated in FIG. 2.
Figure 7:
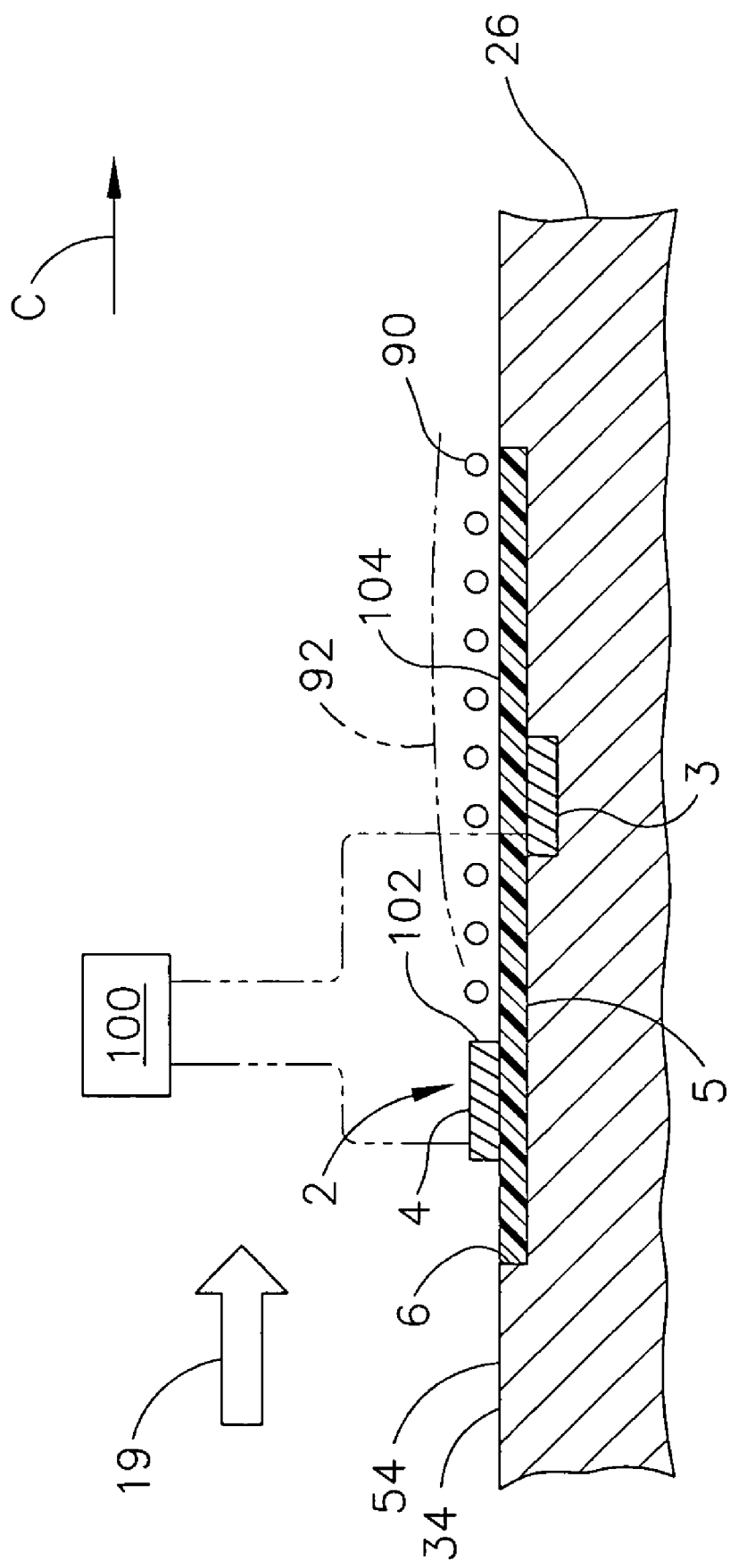
FIG. 7 is a schematical illustration of the leading edge vortex reducing system with the plasma generators illustrated in FIG. 4 energized and a boundary layer.
Figure 8:
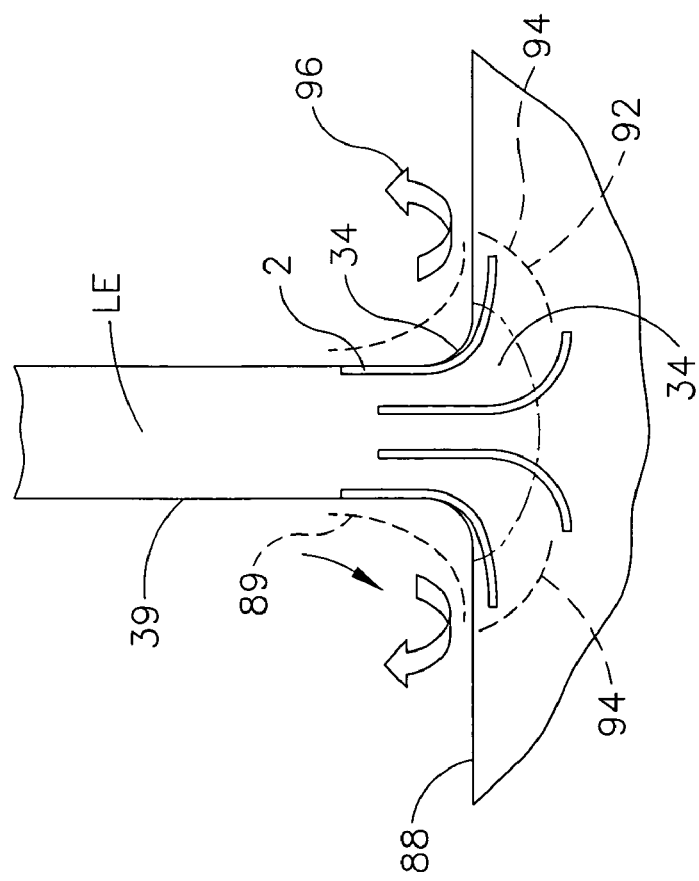
FIG. 8 is a perspective view illustration of an airfoil and end wall with the leading edge vortex reducing system with the plasma generators illustrated in FIG. 4 energized and a boundary layer.

In the exemplary embodiment of the leading edge vortex reducing system 11 illustrated herein, the plasma generators 2 are disposed or mounted on the pressure and the suction sides 46, 48 of the airfoil 39 in the leading edge region 89. The plasma generators 2 extend spanwise or radially from on the end walls 88 through the fillet 34 up onto the airfoil 39 as illustrated in FIGS. 8-9. The plasma generators 2 are operable for producing the plasma 90 extending over a portion of the fillet 34 in the leading edge region 89. Referring to FIG. 5, the leading edge vortex reducing system 11 illustrated herein includes two chordwise spaced apart plasma generators 2 on each of the pressure and suction sides 46, 48 of the airfoils 39. There can be one or more chordwise spaced apart plasma generators 2 on each of the pressure and suction sides 46, 48 of the airfoils 39. Referring to FIG. 7, each of the plasma generators 2 includes inner and outer electrodes 3, 4 separated by a dielectric material 5. The dielectric material 5 is disposed within spanwise extending grooves 6 in the outer hot surfaces 54 of outer walls 26 of the airfoils 39 and, in particular, in the fillets 34.

An AC power supply 100 is connected to the electrodes to supply a high voltage AC potential to the electrodes. The chordwise spaced apart plasma generators 2 produce an airfoil surface conforming plasma 90 along the fillets 34 in the leading edge region 89. When the AC amplitude is large enough, the gas flow 19 ionizes in a region of largest electric potential forming the plasma 90. The plasma generators 2 produce an outer surface conforming plasma 90 which covers the fillets 34 in the leading edge region 89. The plasma 90 produces an enlarged virtual aerodynamic leading edge to form which reduces the strength of the horseshoe vortices.

The plasma 90 generally begins at an edge 102 of the outer electrode 4 which is exposed to the gas flow 19 and spreads out over an area 104 projected by the outer electrode 4 which is covered by the dielectric material 5. The plasma 90 in the presence of an electric field gradient produces a force on the gas flow 19 located in the fillets 34 in the leading edge region 89 as further illustrated in FIG. 8. This induces a virtual aerodynamic shape or plasma induced body 92 that causes a change in the pressure distribution over the surface of the outer wall 26 of the airfoil 39 in the leading edge region 89 of the fillets 34. This plasma induced body 92 operates to produce a larger effective leading edge or a virtual leading edge 94 which reduces the strength of the horseshoe vortices 96.

When the plasma generators 2 are turned on, the effective leading edge in the leading edge region 89 grows to include the virtual leading edge which reduces the strength of the horseshoe vortices. When the plasma generators 2 are turned off, the effective leading edge in the leading edge region 89 is the physical or actual leading edge in the leading edge region 89 as illustrated in FIG. 9. The plasma generators 2 may be operated in either steady state or unsteady modes. An electronic controller 51 may be used to control and turn on and off plasma generators 2 and an active clearance control system if the engine has one.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. A leading edge vortex reducing system comprising:
   a gas turbine engine airfoil extending in a spanwise direction away from an end wall,
   a fillet between the airfoil and the end wall,
   a leading edge region of the fillet near and around a leading edge of the airfoil,
   one or more plasma generators extending in the spanwise direction through the fillet in the leading edge region, and
   the plasma generators being operable for producing a plasma extending over a portion of the fillet in the leading edge region.

2. A system as claimed in claim 1 further comprising the plasma generators being mounted on an outer wall of the airfoil.

3. A system as claimed in claim 2 further comprising:
   the gas turbine engine airfoil extending in a chordwise direction between the leading edge and a trailing edge of the airfoil,
   a first portion of the plasma generators on a pressure side of the airfoil, and
   a second portion of the plasma generators on a suction side of the airfoil.

4. A system as claimed in claim 3 further comprising the first and second portions each having two of the plasma generators.

5. A system as claimed in claim 1 further comprising the plasma generators including inner and outer electrodes separated by a dielectric material.

6. A system as claimed in claim 5 further comprising an AC power supply connected to the electrodes to supply a high voltage AC potential to the electrodes.

7. A system as claimed in claim 6 further comprising the dielectric material being disposed within a groove in an outer hot surface of an outer wall of the airfoil.

8. A system as claimed in claim 7 further comprising:
   the gas turbine engine airfoil extending in a chordwise direction between the leading edge and a trailing edge of the airfoil,
   a first portion of the plasma generators on a pressure side of the airfoil, and
   a second portion of the plasma generators on a suction side of the airfoil.

9. A system as claimed in claim 8 further comprising a high pressure turbine nozzle vane including the airfoil extending radially in a spanwise direction between radially inner and outer bands respectively and the end wall being one of the bands.

10. A system as claimed in claim 8 further comprising a high pressure turbine blade including the airfoil extending radially outwardly from an airfoil base on a blade platform and the end wall being the blade platform.

11. A leading edge vortex reducing system comprising:
    a vane assembly including a row of circumferentially spaced apart and radially extending gas turbine engine vanes,
    each of the vanes having an airfoil extending radially in a spanwise direction between radially inner and outer bands,
    the airfoil having an outer wall extending in a chordwise direction between opposite leading and trailing edges,
    fillets between the airfoil and the inner and outer bands,
    leading edge regions of the fillets near and around a leading edge of the airfoil, and
    one or more plasma generators extending in the spanwise direction through the fillets in the leading edge regions.

12. A system as claimed in claim 11 further comprising a first portion of the plasma generators on a pressure side of the airfoil and a second portion of the plasma generators on a suction side of the airfoil.

13. A system as claimed in claim 12 further comprising the plasma generators including inner and outer electrodes separated by a dielectric material.

14. A system as claimed in claim 13 further comprising an AC power supply connected to the electrodes to supply a high voltage AC potential to the electrodes.

15. A system as claimed in claim 14 further comprising the dielectric material being disposed within a groove in an outer hot surface of an outer wall of the airfoil.

16. A system as claimed in claim 11 further comprising the plasma generators including inner and outer electrodes separated by a dielectric material.

17. A system as claimed in claim 16 further comprising an AC power supply connected to the electrodes to supply a high voltage AC potential to the electrodes.

18. A system as claimed in claim 17 further comprising the dielectric material being disposed within a groove in an outer hot surface of an outer wall of the airfoil.

19. A leading edge vortex reducing system comprising:
 a high pressure turbine including a row of circumferentially spaced apart turbine blades,
 each of the turbine blades having a turbine airfoil extending radially outwardly in a spanwise direction from an airfoil base on a blade platform,
 the airfoil having an outer wall extending in a chordwise direction between opposite leading and trailing edges,
 a fillet between the airfoil and the blade platform,
 a leading edge region of the fillet near and around a leading edge of the airfoil, and
 one or more plasma generators extending in the spanwise direction through the fillet in the leading edge region.

20. A system as claimed in claim 19 further comprising a first portion of the plasma generators on a pressure side of the airfoil and a second portion of the plasma generators on a suction side of the airfoil.

21. A system as claimed in claim 20 further comprising the plasma generators including inner and outer electrodes separated by a dielectric material.

22. A system as claimed in claim 21 further comprising an AC power supply connected to the electrodes to supply a high voltage AC potential to the electrodes.

23. A system as claimed in claim 22 further comprising the dielectric material being disposed within a groove in an outer hot surface of an outer wall of the airfoil.

24. A system as claimed in claim 19 further comprising the plasma generators including inner and outer electrodes separated by a dielectric material.

25. A system as claimed in claim 24 further comprising an AC power supply connected to the electrodes to supply a high voltage AC potential to the electrodes.

26. A system as claimed in claim 25 further comprising the dielectric material being disposed within a groove in an outer hot surface of an outer wall of the airfoil.

27. A method for operating a leading edge vortex reducing system, the method comprising:
 energizing one or more plasma generators to form a plasma extending over a portion of a fillet in a leading edge region of a gas turbine engine airfoil,
 the airfoil extending in a spanwise direction away from an end wall,
 the fillet being between the airfoil and the end wall, and
 the leading edge region being near and around a leading edge of the airfoil and being near the fillet.

28. A method as claimed in claim 27 wherein the energizing further includes supplying an AC potential to inner and outer electrodes separated by a dielectric material of the plasma generator.

29. A method as claimed in claim 28 further comprising operating the plasma generator in steady state or unsteady modes.

30. A method as claimed in claim 27 further comprising using a first portion of the plasma generators mounted on a pressure side of the airfoil and a second portion of the plasma generators mounted on a suction side of the airfoil to form the plasma on the pressure and suction sides of the airfoil.

31. A method as claimed in claim 30 wherein the energizing further includes supplying an AC potential to inner and outer electrodes separated by a dielectric material of the plasma generator.

32. A method as claimed in claim 31 further comprising operating the plasma generator in steady state or unsteady modes.

33. A method for operating a leading edge vortex reducing system, the method comprising:
 energizing one or more plasma generators to form plasma extending over leading edge regions of fillets of a gas turbine engine airfoil,
 the airfoil extending radially in a spanwise direction between radially inner and outer bands,
 the fillets being between the airfoil and the inner and outer bands, and
 the leading edge regions being near and around a leading edge of the airfoil.

34. A method as claimed in claim 33 further comprising the plasma generators extending in the spanwise direction through the fillets in the leading edge regions.

35. A method as claimed in claim 33 wherein the energizing further includes supplying an AC potential to inner and outer electrodes separated by a dielectric material of the plasma generators.

36. A method as claimed in claim 35 further comprising operating the plasma generator in steady state or unsteady modes.

37. A method as claimed in claim 33 further comprising using a first portion of the plasma generators mounted on a pressure side of the airfoil and a second portion of the plasma generators mounted on a suction side of the airfoil to form plasma on the pressure and suction sides of the airfoil respectively.

38. A method as claimed in claim 37 wherein the energizing further includes supplying an AC potential to inner and outer electrodes separated by a dielectric material of the plasma generator.

39. A method as claimed in claim 33 further comprising operating the plasma generator in steady state or unsteady modes.

\* \* \* \* \*